R. C. Mauck.
Corn Harvester.
No. 22,508. Patented Jan. 4, 1859.
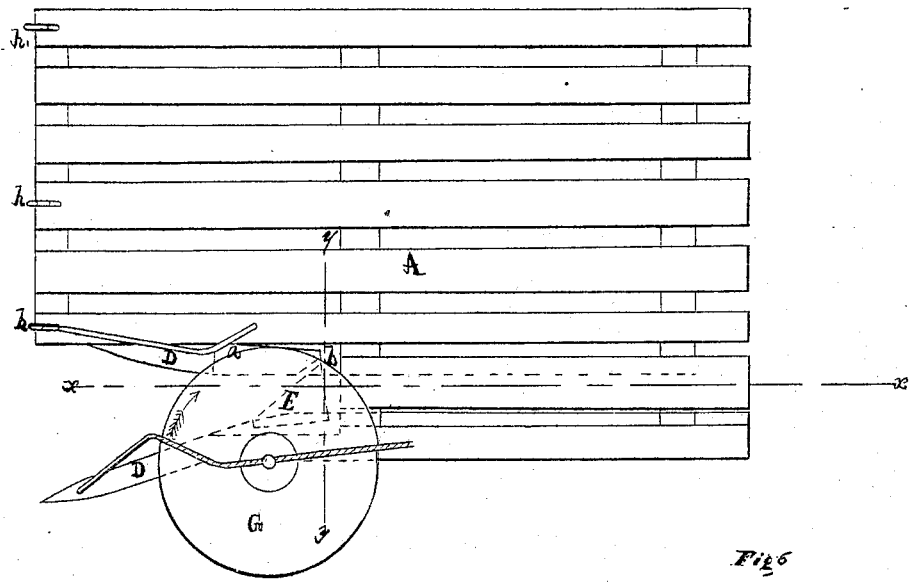
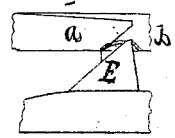
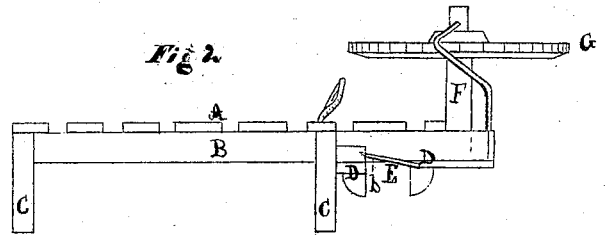
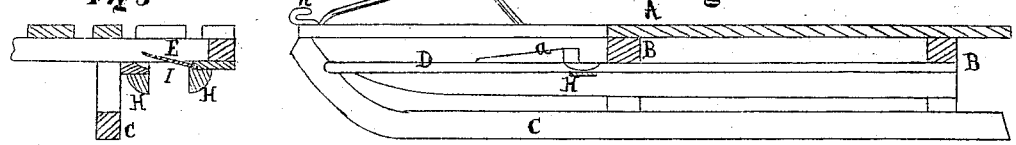
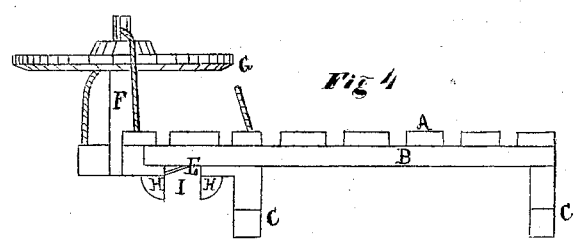

UNITED STATES PATENT OFFICE.

R. C. MAUCK, OF CONRAD'S STORE, VIRGINIA.

IMPROVEMENT IN CORN-HARVESTERS.

Specification forming part of Letters Patent No. 22,508, dated January 4, 1859.

*To all whom it may concern:*

Be it known that I, R. C. MAUCK, of Conrad's Store, in the county of Rockingham and State of Virginia, have invented a new and useful Improvement in Corn-Harvesters; and I do hereby declare that the following is a full, clear, and exact description of the same, reference being had to the annexed drawings, forming part of this specification, in the several figures of which similar characters of reference denote the same parts.

Figure 1 is a top view of the machine. Fig. 2 is a front elevation of the same. Fig. 3 is a vertical section on line $x\,x$. Fig. 4 is a rear elevation of machine. Fig. 5 is a vertical section on line $y\,y$.

My invention has for its object the cutting of Indian corn, the depositing it upon the machine, and the manner of guiding the machine.

It consists in a bearing-wheel rotated by the stalk, by which the cut product is thrown across the machine, and which serves, by bending the stalk over a rest-block at the time of cutting, to facilitate that operation, as will be hereinafter set forth.

The invention further consists in a peculiar manner of attaching the cutter, and in providing longitudinal pieces below the frame and behind the knife, whereby a channel or groove is formed, which, by passing over the stumps, keeps the machine in line, as will be set forth.

In the drawings, A is the top of the machine, resting upon cross-pieces B, which are supported on runners C, or in any other suitable manner.

At the side of the machine are the cornstalk-guides D D, forming a jaw for the reception of the stalks as the machine moves forward. Near the vertex of the angle thus formed, and secured to the outer longitudinal piece, is the cutter E, having an oblique cutting-edge, and so secured to the frame that the point is elevated above the butt, as shown in Fig. 5, its point projecting over the opposite string-piece $b$, which is cut away below the point for the passage of trash.

Upon string-piece $b$ is the inclined rest-block $a$, rising from front to rear, as shown in Fig. 3, and upon the outer string-piece is a standard, F, holding upon its head a loose wheel, G, extending over the knife and bearing-block.

Under the cutter, and extending to the rear along the under side of the frame, are pieces H H, forming a groove, I, under and behind the cutter, into which the stumps pass after the cut, and, by bearing against the sides of the groove, serve to guide the machine along the row of standing corn.

The team is attached to the machine by hooks $h\,h$ and driven forward, so as to embrace the standing corn between the guides D D. As the stalk meets the wheel G it will produce a rotation thereof in direction of arrow. This rotation will bear the stalk over to the frame portion of the machine without the stalk being subjected to the friction which would be produced by using a stationary guide to effect the same purpose, and the consequent pressing forward of the stalk. This bends the stalk over the rest-block, so that the edge of the knife encounters the convex portion of the stalk and causes the fibers to separate readily as the knife passes across them. The wheel then deposits the cut stalk across the frame of the machine.

In effecting the cut the trash passes off and under the end of the knife, and is carried away by the stumps as they guide the machine in its progress.

The advantages of this construction consist in the guiding of the machine by the stumps of the cut product, and in the ease with which the cut is effected and the severed stalk deposited upon the machine.

What I claim as my invention, and desire to secure by Letters Patent, is—

1. The bearing-wheel G, arranged substantially as and for the purpose set forth.

2. The combination of the bearing-wheel G and the rest-block $a$ for submitting the stalk to the knife in the best manner to effect the cut.

3. Guiding the machine by the passage of the groove I over the stumps of the cut product.

In testimony whereof I have hereunto signed my name before two subscribing witnesses.

R. C. MAUCK.

Witnesses:
 GEO. PATTEN,
 JOHN S. HOLLINGSHEAD.